United States Patent [19]

Morters et al.

[11] 4,078,191

[45] Mar. 7, 1978

[54] CONTROL SYSTEM FOR REGULATING THE TORQUE AND SPEED OF AN ELECTRIC MOTOR

[75] Inventors: Ronald W. Morters; Lawrence A. Millonzi, both of Milwaukee, Wis.

[73] Assignee: Harnischfeger Corporation, W. Milwaukee, Wis.

[21] Appl. No.: 698,773

[22] Filed: Jun. 22, 1976

[51] Int. Cl.² .......................................... H02P 5/40
[52] U.S. Cl. .................................................. 318/227
[58] Field of Search .......... 318/227, 230, 231, 207 R, 318/203 R

[56] References Cited

U.S. PATENT DOCUMENTS

| 3,593,083 | 7/1971 | Blaschke | 318/227 |
|---|---|---|---|
| 3,753,064 | 8/1973 | Agarwal et al. | 318/227 |

Primary Examiner—Herman J. Hohauser
Attorney, Agent, or Firm—James E. Nilles

[57] ABSTRACT

A control system for regulating the torque and speed of an alternating current induction motor used in the traverse drive of an overhead travelling crane comprises an SCR bank controlled by a firing circuit responsive to actuation of an operator-controlled induction master control. The control system further comprises means for deriving a torque signal indicative of instantaneous rotor torque, means for deriving a speed signal indicative of instantaneous rotor speed, and summing means for combining the torque signal, the speed signal, and a reference signal from the induction master control to provide an error signal which is used to operate the firing circuit to thereby control the power delivered by the SCR bank to the motor and ensure that motor torque is constant for the control position selected or speed is controlled up to the torque level selected. The means for deriving the torque signal comprises means for deriving a voltage signal indicative of the instantaneous line-to-neutral voltage in the motor stator winding; means for deriving a current signal indicative of the instantaneous current in one or more phase lines to the motor stator winding; and multiplying means for multiplying the voltage and current signals to provide a wattage or torque signal which is proportional to the instantaneous torque being developed by the motor. The wattage supplied to the motor minus the wattage attributable to fixed motor losses and minus the wattage attributable to variable losses in the rotor resistance is directly related to the wattage delivered as horsepower (wattage) delivered by the motor shaft. The means for deriving the speed signal measure the magnitude of the instantaneous rotor voltage by sampling during a fixed period voltage derived from the supply voltage. The voltage being sampled is the voltage at the slip resistors connected to the motor rotor. Means are provided to combine the speed signal with the torque signal only after motor speed exceeds a desired level.

24 Claims, 2 Drawing Figures

CONTROL SYSTEM FOR REGULATING THE TORQUE AND SPEED OF AN ELECTRIC MOTOR

BACKGROUND OF THE INVENTION

1. Field of Use

This invention relates generally to a control system for regulating the torque and speed of a wound rotor electric motor such as is used, for example, in the traverse drive of an overhead travelling crane.

2. Description of the Prior Art

In the operation of overhead travelling cranes used in industry, it is desirable to be able to regulate the torque and speed of the traverse drive motor to provide for smooth acceleration, speed regulation, and good inching performance so as to reduce or prevent swinging or jerking of a load suspended from the crane hook at the traverse drive motor is started, stopped, accelerated, decelerated, and during transitions between forward and reverse movement. Heretofore, in some cranes where the traverse wheels were driven by an alternating current wound rotor motor, primary or secondary reactors were employed to regulate power in the motor. Banks of SCRs have also been used to regulate primary power. Direct current choppers have been used to effectively change secondary resistance and thus effect motor control. As implemented, most of these control schemes obtain torque and speed control through similar methods. Torque control has in general really been a current control. For example, in a secondary reactor system, when the motor is plugged, torque was controlled solely by regulating current to the motor. However, current flow in the secondary winding of the motor is not only a function of motor torque but also of the total power supplied to the motor. Control of current without any reference to the power factor leads to a rather nonlinear torque/speed characteristic. In the past it has been up to the operator to compensate for these nonlinearities by manipulation of the operator's control handle to prevent too rapid acceleration or deceleration of the traverse drive, with resultant swinging of the suspended load. However, speed control has been obtained through the use of a DC tachometer, but, while this provides excellent control, it detracts from the simplicity and ruggedness normally desired in an alternating current induction drive. Where torque and speed have been used in conjunction with one another, it has been a simple summing circuit which in general was accompanied by poor regulation.

SUMMARY OF THE INVENTION

The traverse drive of an overhead travelling crane employs an alternating current wound rotor motor, and a control system is provided for regulating the torque and speed of the motor. The control system comprises a bank of SCRs controlled by firing pulse generators which regulate the electric power applied to the motor in response to an actuation of an operator controlled induction master control. The control system further comprises means for deriving a voltage signal indicative of the instantaneous voltage in the motor stator winding; means for deriving a current signal indicative of the instantaneous current in the motor stator winding; and means for multiplying the voltage and current signals to provide a wattage or torque signal which is proportional to the instantaneous torque being developed in the motor. The control system further comprises means for deriving a speed signal which is indicative of instantaneous motor speed; means for combining the aforesaid torque signal and speed signal (after motor speed exceeds a predetermined speed) to provide a feedback signal; and means, including a summing circuit, wherein the feedback signal is compared to a reference signal from the induction master control to provide an error signal which is applied to the firing pulse generators to thereby regulate the bank of SCRs to effect torque and speed control of the motor. The means for deriving the speed signal indicative of instantaneous motor speed measures the magnitude of the instantaneous rotor voltage. During a fixed period of time, the sampling time period has a fixed time relation to the impressed stator voltage. The means for deriving the sampling period comprises a transformer and "solid state" timing circuit. The instantaneous rotor voltage is integrated by a "solid state" circuit and thereby gives an indication of rotor speed to a first approximation.

In a control system in accordance with the invention the torque signal is derived from two sources, namely, from a voltage signal indicative of the line-to-neutral voltage in the motor stator, and a current signal proportional to the current in one or more of the phase lines to the motor. The aforesaid signals representative of voltage and current are directed to a multiplier circuit which converts them to the torque signal, which takes the form of a voltage signal proportional to the torque being developed by the motor. The torque signal is based on the concept that power in watts supplied to the motor is equal to the sum of the watts delivered as horsepower or torque at the motor shaft plus watts consumed by the motor rotor resistance plus total fixed motor losses measured in watts. The proportional wattage between shaft horsepower and rotor resistance losses have a fixed relationship, taking into account fixed motor losses, and a control signal based thereon can be employed to control the SCRs to regulate torque delivered by the motor.

A control system in accordance with the present invention provides true torque control thereby eliminating nonlinearities, and effects regulation of both torque and speed of the motor to provide smoother acceleration (due to smoother torque control), more tightly regulated speed, better inching speed, and prevention of jerking and swinging of the crane load. In a control system in accordance with the invention both torque and speed are automatically regulated, and both torque and speed are proportional to the throw of a single operator's handle. A system in accordance with the invention eliminates wheel spin and jerk in a traverse drive for a crane, greatly reduces bad swing and provides for easier crane control by the crane operator. Other objects and advantages of the invention will hereinafter appear.

DESCRIPTION OF A PREFERRED EMBODIMENT

Figure 1:
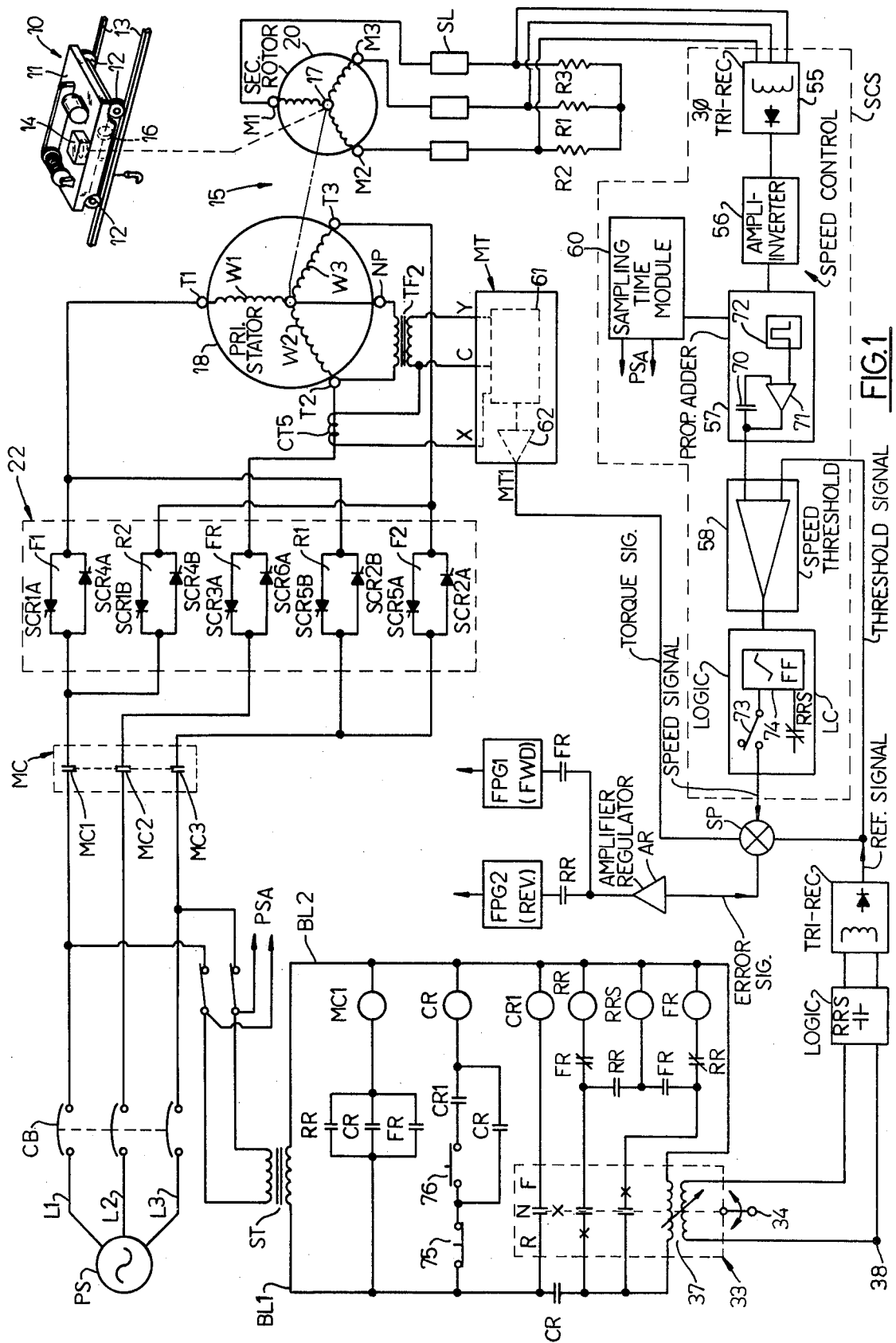
FIG. 1 is a schematic diagram of a motor control system in accordance with the present invention for the motor of the traverse drive of an overhead travelling crane.

Referring to FIG. 1 of the drawing, the numeral 10 designates an overhead travelling crane which comprises a carriage 11 having four traverse wheels 12 by means of which the crane is supported and driven on a pair of overhead rails 13. Two of the wheels, for example, are driven in a conventional manner through a traverse drive mechanism 14 by an alternating current wound rotor motor 15 which is mounted on the carriage 11 of crane 10. A spring applied electrically releasable brake 16 is provided for the shaft 17 of motor 15 and the wheels 12 which it drives.

FIG. 1 shows a control system in accordance with the invention which is provided for regulating the torque and speed of the motor 15. Generally considered, the control system comprises a bank 22 of SCRs controlled by firing pulse generators FPG 1 and FPG 2 which regulate the electric power applied to the motor 15 from an alternating current power source PS in response to an actuation of an operator controlled induction master control 33. The control system further comprises means, including a transformer TF2, for deriving a voltage signal indicative of the instantaneous voltage in the motor stator (primary) winding 18; means, including current transformer CT5, for deriving a current signal indicative of the instantaneous current in the motor stator winding 18; and means, including a multiplier MT, for multiplying the voltage and current signals to provide a wattage or torque signal which is proportional to the instantaneous torque being developed in the motor 15. The control system further comprises means, hereinafter described, for deriving a speed signal which is indicative of instantaneous motor speed; means, including a logic circuit LC, to allow the combination of the aforesaid torque signal and speed signal (after motor speed exceeds a predetermined speed so that during "plugging" only the torque control prevails) to provide a feedback signal; and means, including a summing circuit SP, wherein the feedback signal is compared to a reference signal from the induction master control 33 to provide an error signal which is applied to the amplifier regulator AR thence to the firing pulse generators FPG1 and FPG2 to thereby regulate the bank 22 of SCRs to effect torque and speed control of the motor 15. The aforementioned means for deriving the speed signal indicative of instantaneous motor speed measures the magnitude of the instantaneous rotor voltage during a fixed period being of fixed time relationship to the stator supply voltage, the sensed rotor voltage being derived from the slip rings SL and slip resistors R1, R2, and R3 connected to the motor rotor 20.

As FIG. 1 shows, the motor 15 comprises a stator (or primary winding) 18 having terminals T1, T2, and T3, and a rotor (or secondary winding) 20 having terminals M1, M2, and M3. Motor stator 18 has three star-connected stator windings W1, W2, and W3 which are all joined together at a neutral point designated NP. The motor 15 and control system are energizable from, for example, a 460 volt three phase 60Hz alternating current power source PS connected to the phase lines L1, L2, and L3. The phase lines L1, L2, and L3 are connectable to the SCR stack 22 through the contacts of a conventional motor contactor MC having contacts MC1, MC2, and MC3 and thence to motor stator terminals T1, T2, and T3. The phase lines L1, L2, and L3 are also connectable to the motor control system as hereinafter explained. The motor rotor 20 has a bank of 30% slip resistors R1, R2, and R3 connected in circuit with the rotor terminals M1, M2, and M3 in a conventional manner.

As FIG. 1 shows, the SCR bank 22 comprises five pairs of SCRs (silicon controlled rectifiers), designated F1, F2, R1, R2, and FR which are arranged in circuit in the phase lines L1, L2, and L3, between contactor MC and the motor stator terminals T1, T2, and T3. Each of the five pairs of SCRs comprises a pair of SCRs connected in parallel with each other in oppositely poled relationship. Pair R1 comprising SCR5B and SCR2B is connected between phase line L3 and motor stator terminal T1. Pair F1 comprising SCR1A and SCR4A is connected between phase line L1 and motor stator terminal T1. Pair FR comprising SCR3A and SCR6A is connected between phase line L2 and motor stator terminal T2. Pair F2 comprising SCR5A and SCR2A is connected between phase line L3 and motor stator terminal T3. Pair R2 comprising SCR1B and SCR4B is connected between phase line L1 and motor stator terminal T3. The SCR pairs F1, F2, and FR are operative to connect the motor for operation in a forward direction, and the SCR pairs R1, R2, and FR are operative to connect the motor for operation in the reverse direction.

As FIG. 1 shows, the SCR bank 22 controls or regulates the energization of motor 15, the direction of rotation of the motor, and the speed and torque of the motor in response to control signals received from firing pulse generators FPG1 and FPG2. Firing pulse generator FPG1 controls forward operations of motor 15, and firing pulse generator FPG2 controls reverse operations of the motor. The circuitry and mode of operation of an SCR bank such as 22 and firing pulse generators such as FPG1 and FPG2 are described in detail in U.S. patent application Ser. No. 607,601, filed Aug. 25, 1975, by Price and Nash for "Direct Current Braking Means for Wound Rotor Motor" and assigned to the same assignee as the present application. The firing pulse generator FPG1 effects operation of the following SCRs: SCR4A, SCR1A, SCR6, SCR3, SCR2A, SCR5A. Firing pulse generator FPG2 operates SCR4B, SCR1B, SCR6, SCR3, SCR2B, SCR5B.

Referring to FIG. 1, there is shown a diagram of the circuit for controlling the energization of the motor 15 and the control system. This circuit comprises a step-down transformer ST which has its primary winding connected across the phase lines L1 and L2 and which has its secondary winding connected to energize two bus lines BL1 and BL2. An induction master control 33 and the following five relay coils are connected across and energizable from the bus lines BL1 and BL2 when the various contacts in series therewith are closed; namely, relay coils CR, CR1, RR, RRS, FR, and contactor coil MC1.

Induction master control 33 has an operator's control handle 34 enabling it to be operated from an off position to a forward speed point F to close its forward contact F, or to a reverse speed point R to close its reversing contact R. Induction master control 33 also comprises a variable output transformer 37 which provides a variable output alternating current, voltage signal at its output terminal 38, which signal is proportional to handle throw, and is used for motor control purposes, being applied to summing circuit SP after rectification and integration (smoothing). The induction master control 33 is a conventionally known type of motor control device. It is to be noted that the relay coil FR controls the similarly designated contacts to effect operation of the appropriate firing pulse generators FPG1 and FPG2 for operation of the motor 15 in the forward or reverse direction in response to operation of the induction master control 33.

Referring to FIG. 1, the control system comprises means for deriving a voltage signal indicative of the instantaneous voltage in the motor 15. Such means comprise a transformer TF2 for measuring line-to-neutral voltage in motor stator 18 and for providing a voltage signal proportional thereto. One end of the primary winding of transformer TF2 is connected to the terminal T2 of the motor stator 18. The other end of the primary winding of transformer TF2 is connected to terminal NP of motor stator 18. Thus, transformer TF2 senses the line-to-neutral voltage in motor stator 18 and provides a voltage signal proportional thereto across the output terminals Y and C of the secondary winding of transformer TF2 which are connected to multiplier MT.

The control system further comprises means for deriving a current signal indicative of the instantaneous current in motor stator 18. Such means comprise a current transformer CT5 which is electrically coupled to the phase line L2 between the SCR bank 22 and terminal T2 of the motor stator 18. One end of the current transformer CT5 is connected to a common terminal on transformer TF2, and the other terminal of the current transformer CT5 is connected to a terminal X in the multiplier circuit MT. The current signal appearing as the output of the current transformer CT5 is proportional to the current in the phase line L2 to motor 15.

Figure 2:
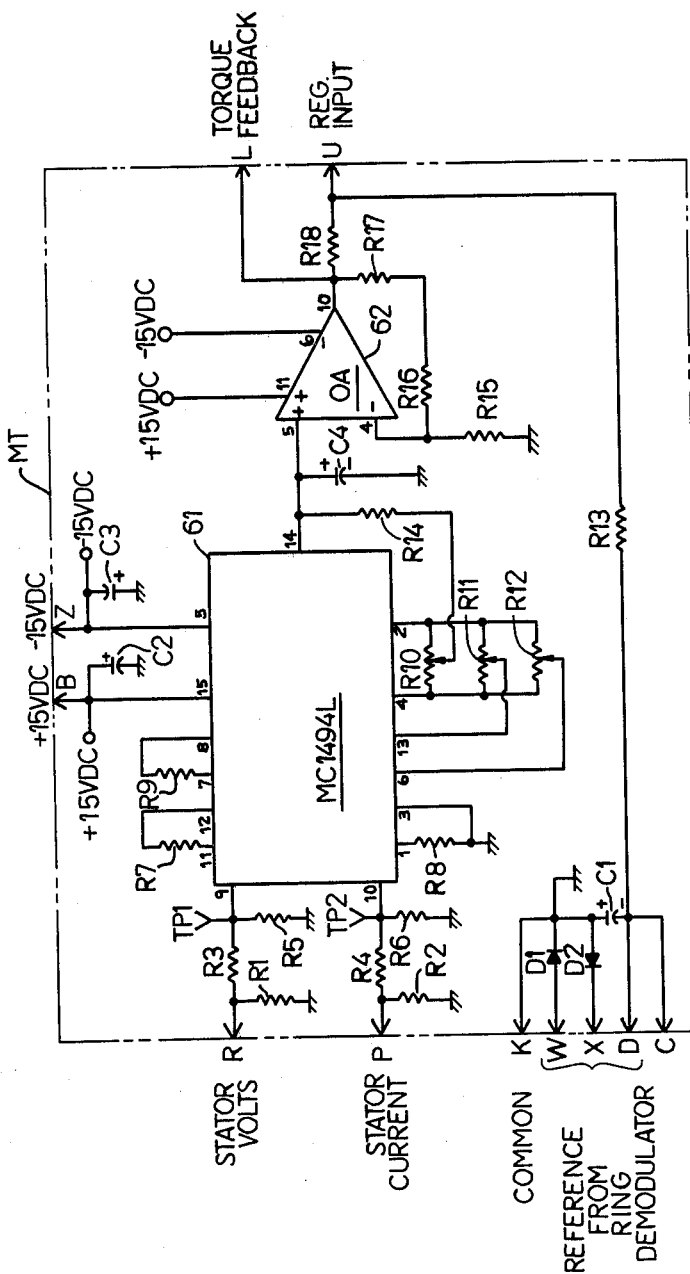
FIG. 2 is a circuit diagram of a portion of the schematic diagram shown in FIG. 1 and, in particular, depicts the torque control portion of the circuit.

Means are provided for multiplying the voltage signal appearing across the output terminals Y and C of transformer TF2 and the current signal appearing across the output terminals X and C of the current transformer CT5 to provide a wattage or torque signal in the form of a voltage at the output terminal MT1 of multiplier MT which is proportional to the instantaneous torque being developed by motor 15. Referring to FIG. 2 which is a circuit diagram of the multiplier circuit MT shown in FIG. 1, it is seen that the circuit generally comprises a linear four-quadrant multiplier integrated circuit device 61 (typically a Motorola type MC1494L) and an operational amplifier 62 (typically a type 741C Motorola). The input terminals 9 and 10 of multiplier 61 are connected to the terminals Y and X, respectively, as shown in FIG. 2. The output terminal 14 of multiplier 61 is connected to positive input terminal 5 of operational amplifier 62. The negative input terminal 4 of operational amplifier 62 is connected to ground through a resistor R15. The output terminal 10 of operational amplifier 62 is connected to provide an output voltage at its output terminal 10 which is proportional to the torque of motor 15.

The control system further comprises means for deriving a speed signal from motor 15 which is indicative of instantaneous motor speed and, in the embodiment shown, such means measures the magnitude of the instantaneous rotor voltage. Such means comprise the rotor slip rings SL which are connected to a three-phase transformer rectifier unit 55 and from thence to an amplitude inverter 56. The output of inverter 56 is fed to a time-controlled sampling module switch and integrator 60, the integrated output signal of which is then fed, as at $PS_A$, into a level (voltage) controlled switch SW1. The switch SW1 prevents the speed control circuit SCS from taking effect until the speed of motor 15 exceeds a predetermined value set by the position of the induction master control 33 and the motor load is normal (positive). The output of inverter 56 is also fed to a stator voltage proportional adder 57 and from thence to the input terminal of an operation amplifier 58 which serves as a speed threshold circuit. The output signal from operational amplifier 58 is fed to a logic circuit LC, and the output signal from logic circuit LC is fed to summing point SP as a speed signal. Summing point SP also receives the torque signal hereinbefore referred to from multiplier circuit MT and the reference signal from induction master control 33 to provide an error signal for effecting operation of the firing pulse generator circuits FPG1 and FPG2. By this means only torque control is operative during plugging, thereby preventing a condition of high torque being commanded by the speed control circuit SCS. The logic switching circuit LC includes a switch 73 which sets to "off" every time the induction master control contacts RRS in circuit LC go to an "off" position in response to relay RRS. Switch 73 is reset "on" by a rising speed control signal from the threshold circuit 58.

The following is a description of the operation of the speed control section SCS shown in FIG. 1. Note that speed control only applies to a wound rotor motor having an external rotor resistors such as R1, R2, and R3 and slip rings such as SL to obtain rotor voltage, whereas the torque control can be applied to any induction motor.

The basic principle relied on in the speed control section SCS is that, if the flux appearing across the air gap of an induction motor such as 15 is known, then the voltage generated in the rotor 20 is proportional to the difference in angular velocity of the rotational flux in stator 18 and the rotor conductors. Rotor voltage of motor 15 is a maximum with the rotor 20 stopped (stalled) and zero if the rotor 20 is rotating with the same angular velocity as the flux in stator 18. This is the inverse of the signal situation required to control a "closed loop" system. Therefore, after transformation to a lower voltage level and three-phase rectification through rectifier unit 55, the voltage derived from rotor 20 is applied to amplitude inverter 56 which is a biased differential amplifier, i.e., with rotor 20 stalled and maximum voltage appearing thereat, the output from the three-phase rectifier unit 55 is balanced out by a bias voltage. As the rotor voltage decreases when the rotor 20 picks up speed, the input to the differential amplifier 56 becomes unbalanced and, therefore, puts out a voltage proportional to the difference.

This inverted signal from amplifier 56 is now passed through a time-controlled switch 70 in proportional adder 57, which switch has a fixed sampling time period and also has a fixed time relationship to the impressed voltage on the stator winding 18 of the motor 15. The reason for this is that the rotor voltage is proportional to the difference in angular velocity of the stator *flux* and rotor conductors and, as the flux is varying due to the control of the SCR bank 22 to control the motor, the air gap flux is also varying. Therefore, to obtain a rotor-derived signal of speed, a period of time is chosen during which a known flux condition exists, and by taking a fixed period of time and integrating the rotor-derived voltage over this period, a signal which is proportional to the first approximation is obtained. This speed proportional signal is now applied to variable threshold circuit 58.

Circuit 58 is another differential amplifier but is provided with a bias or threshold signal level which is derived from the operator's induction master control 33. This means that, the more the operator advances the control 33, the higher the threshold level is set and, therefore, the higher the speed derived signal has to rise before it can pass through the amplifier circuit 58 and thereby control the SCR bank 22 via the rest of the circuitry.

Finally, the logic circuit LC switches the speed derived signal "on" by means of switch 73 and allows it to be fed into summing point "SP", but only after the motor speed rises above the threshold level set by the operator's control 33 and the logic circuit LC has been set by the RRS reed switch contacts. This means that, when the operator moves the control 33 handle through the "off" position, the speed signal is blocked at switch 73 and, therefore, the drive system reverts back to a "torque" control for plugging (braking). Then, when motor speed again exceeds speed in the opposite direction, the logic flip flop 74 in the logic circuit LC again is triggered and thereby releases the speed derived signal to the summing point SP and thereby enables control of the SCR bank 22 via the regulator amplifier RA and firing pulse generator's FPG1 and FPG2.

In the control system hereinbefore described, there is regulation of both torque and speed of motor 15 to provide smoother acceleration, more tightly regulated speed, better inching speed, and prevention of jerking and swinging of the crane load. In the control system, both torque and speed are automatically regulated, and both torque and speed are proportional to the throw of the operating handle of the induction master control 33.

The theory and formulation on which the present invention is based may be understood from the following analysis.

Define: $P_G$ - total power in gap
$P_M$ - total mechanical power at shaft
$P_R$ - total power dissipated as heat in rotor circuit (1) $P_G = P_M + P_R$
(2) $P_M = (1-s') P_G$ also
(3) $P_M = (1-s') \omega_s T$ (where $\omega_s$ = synchronous angular velocity)
setting (2) = (3) $s'$ = slip per unit
(4) $(1-s') P_G = (1-s') \omega_s T$ $T$ = torque
solving for T,
$$T = \frac{(1-s') P_G}{(1-s') \omega_s} = \frac{P_G}{\omega_s}$$

Note that torque is *not* a function of speed but only a function of $P_G$. Thus, if $P_G$ is kept constant, T will be constant for all speeds.

We claim:

1. Means for ascertaining the instantaneous torque delivered by an alternating current induction motor having a rotor and a stator and energizable from an a.c. source of electric power comprising:
   means for measuring the instantaneous voltage in said stator and for providing a first electric signal related thereto;
   means for measuring the instantaneous current in said stator and for providing a second electric signal related thereto;
   and means for receiving and multiplying said first and second electric signals and for providing a third electric signal related to the instantaneous wattage in the stator and proportional to the instantaneous torque developed by the rotor.

2. A combination according to claim 1 wherein the means for measuring the instantaneous voltage in said stator senses the voltage being applied from said source across a winding in said stator.

3. A combination according to claim 2 wherein the means for measuring the instantaneous current in said stator senses current being supplied from said source to at least one winding in said stator.

4. A combination according to claim 3 wherein said means for sensing the instantaneous voltage comprises a transformer having its primary connected across a winding in said stator and wherein said means for sensing the instantaneous current comprises at least one current transformer coupled to at least one winding in said stator.

5. In combination:
   an alternating current induction motor comprising a stator and a rotor;
   a source of power including phase lines for energizing said motor;
   regulatable means including a rectifier bank for regulating the power supplied from said source to said motor;
   and control means for operating said regulatable means to regulate the torque delivered by said motor, said control means including torque control means for measuring the power delivered by said motor and for providing a torque signal related thereto for use by said control means, said torque control means comprising means for sensing the instantaneous voltage in said stator and for providing a first signal related thereto, means for sensing the instantaneous current in said stator and for providing a second signal related thereto, and means for multiplying said first and second signals to provide a third signal related to the wattage and, therefore, the torque delivered by said rotor.

6. A combination according to claim 5 wherein said means for sensing the instantaneous voltage in said stator senses the instantaneous voltage applied to said motor between said rectifier bank and said motor, wherein said means for sensing the instantaneous current in said stator senses the current applied to said motor between said rectifier bank and said motor.

7. A combination according to claim 6 wherein said means for sensing the instantaneous voltage comprises a transformer connected across a phase line and neutral wherein said means for sensing the instantaneous current comprises at least one current transformer coupled to at least one phase line.

8. In a control system for regulating the torque of a wound rotor motor energizable from an alternating current source through a controlled rectifier bank, in combination:
   an operator's control movable to selected positions to effect motor operation and for providing a reference signal related to a selected position;
   means for providing a torque signal related to motor torque, said means for providing said torque signal comprising means for sensing the instantaneous wattage being delivered as the power output of said motor;
   and means for comparing said torque signal and said reference signal and for providing an error signal for regulating said controlled rectifier bank to thereby maintain torque constant for a selected position of said operator's control.

9. A control system according to claim 8 wherein said means for sensing instantaneous wattage comprises means for sensing the instantaneous stator voltage, means for sensing the instantaneous stator current, and means for multiplying said instantaneous voltage and said instantaneous current to provide a torque signal representing instantaneous wattage.

10. In combination:
an alternating current induction motor comprising a stator and a rotor;
a source of power for energizing said motor;
a controlled rectifier bank for regulating the power supplied from said source to said motor;
and control means for providing an error signal for controlling said rectifier bank to regulate the torque delivered by said motor, said control means including an operator's control movable to selected positions to effect motor operation and for providing a reference signal related to a selected position, said control means further including torque control means for measuring the torque delivered by said motor and for providing a torque signal related thereto, said torque control means comprising means for sensing the instantaneous voltage in said stator and for providing a first signal related thereto, means for sensing the instantaneous current in said stator and for providing a second signal related thereto, and means for multiplying said first and second signals to provide said torque signal which is related to the wattage and, therefore, the torque delivered by said rotor and said control means further including means for combining said reference signal and said torque signal to provide said error signal.

11. A combination according to claim 10 wherein said means for sensing the instantaneous voltage in said stator senses the instantaneous voltage applied to said motor between said rectifier bank and said motor, wherein said means for sensing the instantaneous current in said stator senses the current applied to said motor between said rectifier bank and said motor.

12. A combination according to claim 11 wherein said means for sensing the instantaneous voltage comprises a transformer connected across a phase line and wherein said means for sensing the instantaneous current comprises at least one current transformer coupled to at least one phase line.

13. In a control system for regulating the speed and torque of an alternating current induction motor energizable from an alternating current source through a controlled rectifier bank, in combination:
an operator's control movable to selected positions to effect motor operation and for providing a reference signal related to a selected position;
means for providing a torque signal related to motor torque;
means for providing a speed signal related to motor speed;
means for combining said torque signal and said speed signal and for providing a feedback signal related thereto; and
means for comparing said feedback signal and said reference signal and for providing an error signal for regulating said controlled rectifier bank to thereby maintain torque constant for a selected position of said operator's control.

14. A control system according to claim 13 wherein said means for providing said torque signal comprise means for sensing the instantaneous wattage being delivered as the power output of said motor.

15. A control system according to claim 14 wherein said means for sensing instantaneous wattage comprises means for sensing the instantaneous stator voltage, means for sensing the instantaneous stator current, and means for multiplying said instantaneous voltage and said instantaneous current to provide a torque signal representing instantaneous wattage.

16. A control system according to claim 13 wherein said means for providing said speed signal is effective to provide said speed signal only when said motor is operating above a predetermined speed.

17. In combination:
a wound rotor motor energizable from an alternating current source through a controlled rectifier bank and a control system for regulating the speed and torque of said motor,
said control system comprising:
an operator's control having an operating member movable between a neutral position and any one of a plurality of operating positions, said control providing a reference signal related to handle movement and position;
means for providing a torque signal related to motor torque;
means for providing a speed signal related to motor speed;
means for combining said torque signal and said speed signal and for providing a feedback signal related thereto;
and means for comparing said feedback signal and said reference signal and for providing an error signal for operating said controlled rectifier bank, so that; when control member movement and motor rotation agree, motor torque and speed are proportional; when control member movement and motor rotation disagree, motor torque is proportional to control member movement and not to motor speed; and when said control member is in a steady state in any one of said plurality of operating positions, torque will not increase if motor speed is at or above the requested speed.

18. A combination according to claim 17 wherein said means for providing said torque signal comprises means for deriving a first signal related to voltage in said motor stator, means for deriving a second signal related to current in said motor stator and multiplier means for combining said first and second signals to provide said torque signal.

19. A combination according to claim 17 wherein said means for providing said speed signal comprises means for deriving a signal related to instantaneous voltage in said motor rotor and instantaneous voltage in said stator.

20. In a control system for regulating the speed and torque of a wound rotor motor energizable from an alternating current source through a controlled rectifier bank, in combination:
an operator's control having a handle selectively movable between a neutral position and another position for providing a reference signal related to handle position;
means for providing a torque signal related to motor torque and comprising means for deriving a first signal related to voltage in said motor stator, means for deriving a second signal related to current in said motor stator and multiplier means for combining said first and second signals to provide said torque signal;
means for providing a speed signal related to motor speed, said means for providing said speed signal comprising means for deriving a signal related to the magnitude of the voltage in said motor rotor;

means including a logic circuit for combining said torque signal and said speed signal and for providing a feedback signal related thereto;

means including a summing circuit for comparing said feedback signal and said reference signal and for providing an error signal; and regulator means for receiving said error signal and for providing control signals for operating said controlled rectifier bank so that; when control member movement and motor rotation agree, motor torque and speed are proportional; when control member movement and motor rotation disagree, motor torque is proportional to control member movement and not to motor speed; and when said control member is in a steady state in any one of said plurality of operating positions, torque will not increase if motor speed is at or above the requested speed.

21. A combination according to claim 20 wherein said means for providing said speed signal comprising means for deriving a signal related to instantaneous voltage in said motor rotor and instantaneous voltage in said motor stator.

22. A combination according to claim 20 wherein said means for deriving said first signal related to voltage in said motor stator includes a transformer for sensing line-to-neutral voltage across one of the windings in said motor stator and wherein said means for deriving said second signal related to current in said motor stator includes a current transformer for sensing current flow in a phase line connected between said controlled rectifier bank and said motor stator.

23. A control system for regulating the speed and torque of a reversible wound rotor motor having stator windings energizable from an alternating current source through a controlled rectifier bank, comprising:

an operator's control having a member selectively movable in opposite directions from a neutral position to effect forward and reverse operation of said motor, said control providing a reference signal related to member position;

means including a transformer for sensing line-to-neutral voltage across a stator winding for deriving a first signal related to voltage in said motor stator;

means including a current transformer for sensing current flow in a phase line connected between said rectifier bank and said motor stator for deriving a second signal related to current in said motor stator;

multiplier means for combining said first and second signals to provide a torque signal related to motor torque;

means for providing a speed signal related to motor speed;

means including a logic circuit for combining said torque signal and said speed signal and for providing a feedback signal related thereto;

means including a summing circuit for comparing said feedback signal and said reference signal and for providing an error signal;

means including a regulator circuit for processing said error signal and providing a control signal output proportional to same;

and firing pulse generator means for receiving said control signal and for providing firing pulses for operating said controlled rectifier bank so that; when control member movement and motor rotation agree, motor torque and speed are proportional; when control member movement and motor rotation disagree, motor torque is proportional to control member movement and not to motor speed; and when said control member is in a steady state in any one of said plurality of operating positions, torque will not increase if motor speed is at or above the requested speed.

24. A control system according to claim 23 wherein said means for providing said speed signal comprises means for deriving a signal related to instantaneous voltage in said motor rotor and instantaneous voltage in said motor stator.

* * * * *